(12) United States Patent
Balaguru

(10) Patent No.: US 8,197,593 B2
(45) Date of Patent: Jun. 12, 2012

(54) LOW-TEMPERATURE CURE INORGANIC COMPOSITIONS

(75) Inventor: Perumalsamy Naidu Balaguru, Milltown, NJ (US)

(73) Assignee: Perumalsamy Balaguru, Milltown, NJ (US)

( * ) Notice: Subject to any disclaimer, the term of this patent is extended or adjusted under 35 U.S.C. 154(b) by 1031 days.

(21) Appl. No.: 12/140,189

(22) Filed: Jun. 16, 2008

(65) Prior Publication Data

US 2008/0311411 A1    Dec. 18, 2008

Related U.S. Application Data

(60) Provisional application No. 60/944,274, filed on Jun. 15, 2007.

(51) Int. Cl.
  C09D 1/02       (2006.01)
  C04B 12/04      (2006.01)
  B32B 13/02      (2006.01)

(52) U.S. Cl. .................. 106/632; 106/612; 106/635

(58) Field of Classification Search .......... 106/600, 106/612, 613, 617, 624, 632, 635; 428/294.7
See application file for complete search history.

(56) References Cited

U.S. PATENT DOCUMENTS

| | | | | |
|---|---|---|---|---|
| 2,864,722 A | * | 12/1958 | Millar et al. | 428/336 |
| 4,349,386 A | * | 9/1982 | Davidovits | 106/813 |
| 4,472,199 A | * | 9/1984 | Davidovits | 106/813 |
| 4,509,985 A | * | 4/1985 | Davidovits et al. | 106/624 |
| 4,798,307 A | * | 1/1989 | Evrard | 220/501 |
| 4,888,311 A | * | 12/1989 | Davidovits et al. | 501/95.2 |
| 2004/0182285 A1 | * | 9/2004 | Mazany et al. | 106/600 |

OTHER PUBLICATIONS

Balaguru et al., Geopolymer Coating Demonstration Project for Route 1-295 Scenic Overlook, FHWA-NJ-2005-021; Final Report Aug. 2006; pp. 1-15.
Nazier M., Evaluation of High Strength Composites and New Construction Techniques for Their Effective Use; Dissertation submitted to the Graduate School-New Brunswick, Rutgers the State University; May 2004.
Garon, Ronald J.; Effectiveness of High Strength Comosites as Structural and Protective Coating for Structural Elements; Dissertation submitted to the Graduate School-New Brunswick, Rutgers the State University of New Jersey; May 2000.
Lyon, Richard E. et al., "Fire-Resistant Aluminosilicate Composites"; Fire and Materials, vol. 21, pp. 67-73, (1997).
Cassar, L., "Photocatalysis of Cementitious Materials: Clean Building and Clean Air"; MRS Bulletin; May 2004.

* cited by examiner

*Primary Examiner* — David M Brunsman
(74) *Attorney, Agent, or Firm* — Fox Rothschild LLP

(57) ABSTRACT

A protective inorganic composition that includes: (a) a liquid composition portion that includes by weight percent of the liquid composition portion: from about 54% to about 58% by weight water, from about 22% to about 26% by weight of an alkali metal oxide component that includes potassium oxide, wherein up to about 30% by weight of the alkali metal oxide component includes sodium oxide, and from about 18% to about 22% by weight amorphous silica; and (b) a powder composition portion that includes by weight percent of the powder composition portion: up to about 65% by weight amorphous silica and one or more components selected from calcined clay, a Group II metal oxide powder, high-temperature resistant fillers, microfibers, and discrete fibers. Also provided are methods for coating a substrate and articles prepared therefrom.

22 Claims, 1 Drawing Sheet

LOW-TEMPERATURE CURE INORGANIC COMPOSITIONS

CROSS-REFERENCE TO RELATED APPLICATION

This application claims priority under 35 U.S.C. §119(e) to U.S. Provisional Application Ser. No. 60/944,274, filed Jun. 15, 2007, the disclosure of which is incorporated herein by reference.

BACKGROUND OF THE INVENTION

Surface deterioration of concrete is becoming one of the major problems for durability of concrete structures. Surface deteriorations could develop into structural problems, especially in reinforced concrete structural elements. The most efficient way to reduce this deterioration is to prevent liquid ingress into concrete, thus preventing the ingress of chemicals such as chloride from salts and subsequent deterioration. The coating used to protect the surface should allow the concrete to breath. Otherwise, the coating will delaminate due to liquid collection at the interface. Therefore, a strong need exists for the development of an inorganic coating, which is less permeable than concrete and will allow the concrete to breath. If the coating can clean any organic chemicals deposited on them then the coating will be much more effective because those organic deposits could contribute to the deterioration of concrete. The self cleaning characteristic also provides an added advantage of aesthetics and reduced maintenance cost. The ingredients that are responsible for self cleaning properties also have potential for de-polluting the surroundings. The components: zinc oxide and anatase titanium oxide were found to be particularly effective for converting $NO_2$ to $NO_3$.

SUMMARY OF THE INVENTION

The present invention relates to a protective inorganic composition that includes: (a) a liquid composition portion that includes by weight percent of the liquid composition portion: from about 54% to about 58% by weight water, from about 22% to about 26% by weight of an alkali metal oxide component that includes potassium oxide, wherein up to about 30% by weight of the alkali metal oxide component includes sodium oxide, and from about 18% to about 22% by weight amorphous silica; and (b) a powder composition portion that includes by weight percent of the powder composition portion: up to about 65% by weight amorphous silica and one or more components selected from calcined clay, a Group II metal oxide powder, high-temperature resistant fillers, microfibers, and discrete fibers.

In one embodiment, the composition includes: (a) a liquid composition portion that includes by weight percent of the liquid composition portion: from about 54% to about 58% by weight water, from about 22% to about 26% by weight of a potassium oxide component, wherein up to about 30% by weight of the potassium oxide component that includes sodium oxide, and from about 18% to about 22% by weight amorphous silica; and (b) a powder composition portion that includes by weight percent of the powder composition portion: about 65% by weight amorphous silica, about 5% by weight calcined clay, wherein the clay comprises about 52% by weight silica and about 48% alumina, about 5% by weight of a Group II metal oxide powder, about 16% by weight high-temperature resistant filler, about 8% by weight microfibers, and about 1% by weight discrete fibers. One part of the liquid composition and two parts the powder composition are mixed in a high shear mixture to obtain a paint like mixture for coating various types of surfaces.

In one embodiment, the amorphous silica has a particle size from about 0.05 to about 2 μm. In another embodiment, the clay has an average particle size from about 1 to about 2 μm. In one embodiment, the zirconium silicate has a maximum particle size of 150 μm. In another embodiment, the discrete fibers have a maximum length of 6 mm and a maximum diameter of 50 μm.

In yet another embodiment, the Group II metal is selected from zinc and calcium. In another embodiment, the high-temperature resistant filler includes zirconium silicate. In yet another embodiment, the microfibers include wollastonite.

In one embodiment, the composition further includes at least one additional component selected from sugars, alcohols, pigments, titanium dioxide, and combinations thereof. In another embodiment, the composition includes a sugar in an amount from about 0.1% to about 1% by weight of the total composition. In another embodiment, the composition includes ethyl alcohol in an amount from about 1% to about 3% by weight of the total composition.

An additional embodiment includes a method for coating a substrate by applying a composition of the present invention onto the substrate and allowing the composition to cure or dry. In another embodiment, the applying step includes spraying, painting, or dip coating the substrate with the composition.

Another embodiment includes a method for coating a substrate by applying a coating that includes magnesium phosphate onto the substrate, allowing the magnesium phosphate coating to cure or dry resulting in a magnesium phosphate layer, applying a composition of the present invention onto at least a portion of the magnesium phosphate layer, and allowing the composition of the present invention to cure or dry.

In one embodiment, the substrate includes concrete, clay, iron, stone, ceramic, timber, steel, plastics, organic or inorganic fabrics, asphalt, painted surfaces, or a combination thereof.

Another embodiment includes a coated substrate. Yet another embodiment includes an article comprising the coated substrate, wherein the article is selected from structural and non-structural components in buildings, for example, exterior walls, interior walls, roofing, bath rooms, tiles, sinks, basements, stairways, and structural supports; marine vessel hulls; interior and/or exterior aircraft components; road surfaces; bridges; tunnels; barriers; and water tanks.

DETAILED DESCRIPTION OF THE INVENTION

Figure 1:
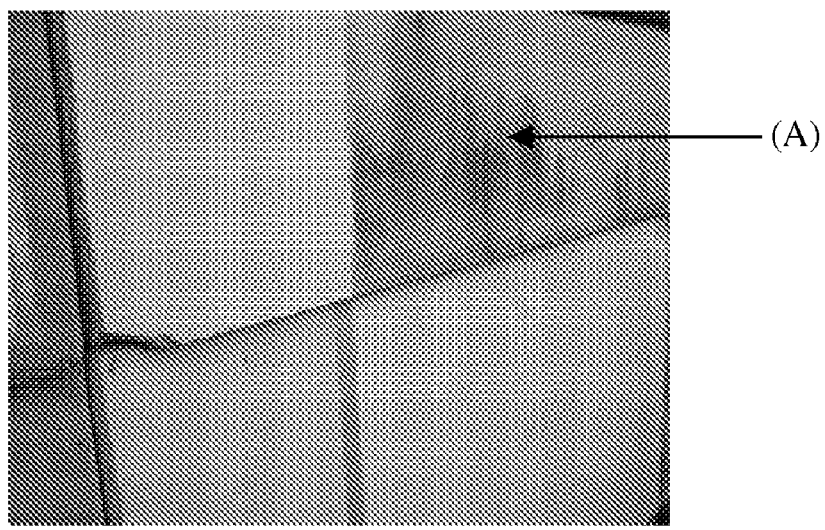
FIG. 1 shows a coated concrete surface adjacent to an uncoated concrete surface, wherein the uncoated surface shows mold growth while the coated concrete surface is free of any mold or fungi growth.

The present invention provides protective inorganic coatings. Methods for coating substrates and coated articles are also presented.

The compositions of the present invention include a combination of (a) a liquid composition portion that includes by weight percent of the liquid composition portion: from about 54% to about 58% by weight water, from about 22% to about 26% by weight of an alkali metal oxide component that includes potassium oxide, wherein up to about 30% by weight of the alkali metal oxide component includes sodium oxide, and from about 18% to about 22% by weight amorphous silica; and (b) a powder composition portion that includes by weight percent of the powder composition portion: up to about 65% by weight amorphous silica and one or more components selected from calcined clay, a Group II metal oxide powder, high-temperature resistant fillers, microfibers, and discrete fibers.

In one embodiment, the compositions of the present invention include a combination of (a) a liquid composition portion, which includes by weight percent of the liquid composition portion: from about 54% to about 58% by weight water, from about 22% to about 26% by weight of a potassium oxide component, wherein up to about 30% by weight of the potassium oxide component comprises sodium oxide, and from about 18% to about 22% by weight amorphous silica; and (b) a powder composition portion, which includes by weight percent of the powder composition portion: about 65% by weight amorphous silica, about 5% by weight calcined clay, wherein the clay comprises about 52% by weight silica and about 48% alumina, about 5% by weight of a Group II metal oxide powder, about 16% by weight high-temperature resistant filler, about 8% by weight micro-fibers, and about 1% by weight discrete fibers.

One advantage provided by the compositions of the present invention is that no toxins or volatile organic compounds (VOCs) are released during the mixing, application, or curing of the compositions.

The individual components of the coating composition can have any suitable size. Preferably, the particle size of the amorphous silica in the powder component is from about 0.05 to about 2 μm. Preferably, the clay has an average particle size from about 1 to about 2 μm. Preferably, the discrete fibers have a maximum length of 6 mm and a maximum diameter of 50 μm. A more preferred maximum length for the discrete fibers is from about 1 mm to about 3 mm. Preferably, the discrete fibers are fabricated from alumina, aramid, carbon, glass, nylon, polypropylene, polyvinyl alcohol, silicon carbide, or a metal, for example, steel, and the like.

Preferably, the clay is calcined at or above 600° C. prior to its addition to the powder composition portion.

Preferably, the Group II metal oxide powder includes a Group II metal selected from zinc, beryllium, magnesium, calcium, strontium, and barium. Zinc and calcium are more preferred.

Suitable micro-fibers include, for example, woolastonite.

Suitable high-temperature resistant fillers include, for example, zirconium silicate powder and ground silica powder. Preferably, the zirconium silicate powder has a maximum particle size of about 150 μm. One of skill in the art can readily determine an appropriate high-temperature resistant filler material based upon the desired operating temperature of the composition.

Optionally, one or more additional components are added to the composition. Suitable additional components include, for example, sugars, alcohols (e.g. ethanol), pigments, titanium dioxide, and combinations thereof. Preferred pigments include inorganic pigments.

When an alcohol is added to the composition, it is preferably in an amount from about 1% to about 3% by weight of the total composition.

When a sugar is added to the composition, it is preferably in an amount from about 0.1% to about 1% by weight of the total composition. When a sugar is present, the pot life (i.e. usable time before the composition starts to thicken) of the composition is typically between about 3 and about 6 hours. If no sugar is added to the composition, the pot life is typically from about 30 minutes to about 2 hours at temperatures varying from about 15 to about 35° C.

Methods for coating a substrate with the compositions of the present invention are also presented. Preferably, the composition is applied at ambient temperature. As used herein, the phrase "ambient temperature" refers to the temperature of the air surrounding the substrate. A preferred temperature range for applying composition is from about 4° C. to about 35° C. The compositions of the present invention are also able to cure or dry at ambient temperature. A preferred temperature range for curing or drying the composition is from about 10° C. to about 40° C.

One of skill in the art can readily determine an appropriate means for coating a substrate with the composition based upon, for example, the consistency of the composition and/or the shape of the substrate. Exemplary application techniques include spraying; brush, roller, or spray painting; or dip coating the substrate with the composition.

Substrate materials suitable for coating with the compositions of the present invention include any material to which the coating will adhere. In one embodiment, small amounts of rust in a steel substrate act as an activator for the composition, which improves the bond between the coating and the substrate material. Additional exemplary substrate materials include concrete, clay, iron, stone, ceramic, timber, steel, sheetrock, mortar, and the like.

In another embodiment, adhesion of compositions of the present invention to organic substrates (e.g. asphalt, painted surfaces, and the like) is improved by applying a magnesium phosphate coating to the organic substrate prior to applying a composition of the present invention to at least a portion of the magnesium phosphate layer. Exemplary uses include applying the magnesium phosphate coating to a graffiti-containing surface. A composition of the present invention is then applied to the magnesium phosphate layer to provide a surface that is graffiti resistant. In another embodiment, a magnesium phosphate coating is applied to a paint or polymer coating wherein at least a portion is deteriorated. A composition of the present invention is applied to the magnesium phosphate layer without requiring removal of the deteriorated surface.

The magnesium phosphate coating composition includes magnesium oxide powder and mono-potassium phosphate crystals, or magnesium oxide powder and ammonium phosphate, or a combination of all three components. Magnesium oxide powder (up to 100 μm in diameter) is present in an amount from about 20 g to about 25 g. When present, mono-potassium phosphate crystals (up to 300 μm in diameter) are used in an amount from about 60 g to about 80 g. When present, ammonium phosphate is used in an amount from about 100 g to about 120 g. A suitable amount of water is added to the composition to form a slurry. Optional components can be added to the slurry. Exemplary optional components include fine sand (up to 500 μm in diameter) in an amount from about 50 g to about 100 g, American Society for Testing and Materials (ASTM) Type F fly ash (to increase smoothness). The slurry is applied to the organic substrate using any suitable method, for example, brushing the slurry onto the substrate. After the slurry has dried, a composition of the present invention is applied.

The compositions of the present invention are used to protect underlying substrates from various types of damage and/or deterioration. Preferably, the compositions impart graffiti resistance, fungus resistance, self-cleaning properties, abrasion resistance, and/or resistance to temperatures up to about 1000° C. to coated substrates. The compositions can also impart de-polluting qualities to coated substrates.

Articles containing substrates coated with the compositions of the present invention are also presented. Exemplary coated articles include structural components in buildings, for example, exterior walls, interior walls, roofing, bath rooms, basements, and structural supports; marine vessel hulls and boats; interior and/or exterior aircraft components; road surfaces; bridges; tunnels; barriers; industrial equipment; ceramic tiles, ceramic articles and monoliths; plastic articles and monoliths; wooden products, for example, outdoor decks; and water tanks.

The following non-limiting examples set forth herein below illustrate certain aspects of the invention.

EXAMPLES

Example 1

A liquid composition portion was prepared by combining (by weight percent of the liquid composition portion) 54% by weight water, 26% by weight of a potassium oxide component, and 20% by weight amorphous silica. A powder composition portion was also prepared by combining (by weight percent of the powder composition portion) 65% by weight amorphous silica, 5% by weight calcined clay, wherein the clay is about 52% by weight silica and about 48% alumina, about 5% by weight zinc oxide powder, 16% by weight high-temperature resistant filler (zirconium silicate), 8% by weight microfibers (woolastonite), and 1% by weight discrete carbon fibers that have a maximum length from 1 to 3 mm.

About 200 g of the liquid portion was added to a mixing container. About 400 g of the powder portion was added to the liquid portion. The combination was then mixed together in a high shear mixer for about 1 minute. The composition was allowed to sit for at least about 1 minute after mixing and remixed for another 30 seconds. The resulting mixture was off-white and had the consistency of paint. This formulation had a pot life of about 1 hour at 23° C. The pot life increases at lower temperatures and decreases at higher temperatures. It was applied using brush, roller or paint sprayer. When the surface dried, it became more white as compared to its wet state.

Example 2

After the mixture of Example 1 was allowed to sit for 1 minute, white cane sugar in an amount of 0.5% by weight of the total composition and ethyl alcohol in an amount of about 2% by weight of the total composition were added. The combination was then remixed for about 1 minute and allowed to sit for at least about 3 minutes prior to applying the composition to a surface. This formulation had a pot life of 3 hours at 23° C. as compared to 1 hour for the formulation of Example 1.

Example 3

After the mixture of Example 1 was allowed to sit for 1 minute, a white cane sugar in an amount of 0.5% by weight of the total composition and rubbing alcohol (with 80% by weight alcohol and 20% by weight water) in an amount of 2% by weight of the total composition were added. The combination was then remixed for about 1 minute and allowed to sit for at least about 3 minutes prior to applying the composition to a surface. This formulation had a pot life of 3 hours at 23° C. as compared to 1 hour for the formulation of Example 1.

Example 4

After the mixture of Example 1 was allowed to sit for 1 minute, additional water in an amount of 5% by weight of the total composition was added. The combination was then remixed for 1 minute and allowed to sit for 3 minutes prior to applying the composition to a surface. This formulation was slightly thinner and had a pot life of 1.5 hours as compared to 1 hour pot life for the formulation of Example 1.

Example 5

This example illustrates the use of pigments for obtaining colors. After the mixture of Example 1 was allowed to sit for 1 minute, additional water (which contained coloring pigments) in an amount of 6% by weight of the total composition are added. Iron oxide in an amount of 2% by weight of the total composition was used to obtain a red color. Iron oxide in an amount of 2% by weight of the total composition and copper oxide in an amount of 0.25% by weight of the total composition were added to obtain a brown color. Carbon black in an amount of 1% by weight of the total composition was added to obtain a dark-gray color. In each of the three color compositions, the combination was remixed for about 1 minute and allowed to sit for 3 minutes prior to applying each composition to a surface.

Example 6

This example illustrates the self-cleaning properties of the compositions of the present invention. To the mixture of Example 2, anatase titanium oxide was added in the amount of 5% by weight of total composition. The self cleaning properties were studied using the method described in F. Vallée et al., "Innovative self-cleaning and de-polluting facade surfaces," CIB World Building Congress 2004:

This test consisted in monitoring the rate of photocatalytic decomposition of an organic dye, rhodamine B, by calorimetric measurements on polluted samples exposed to UV irradiation during a 30 h period. Samples were polluted by spraying the dye on the sample surface. Rhodamine B was selected in particular because it has an anthracene moiety and as such is related to a PAH (polycyclic aromatic hydrocarbon). PAHs are among the soiling agents found in urban environments.

For a period of 30 hours, the coated sample was kept under a 300 W Ultra-Vitalux lamp positioned 2 feet from the surface. The efficiency of the coating was determined by measuring the color change rate of the samples due to the photo-destruction of the rhodamine dye. A color meter was used to measure the changes. After 30 hours, the dye was destroyed by 90%.

Example 7

The composition used was the same as Example 6, however, titanium oxide was omitted. This composition contained only zinc oxide for providing self cleaning properties. Zinc oxide alone is effective for self cleaning but the rate of destruction of organic particles settled on the coating is about 80% as compared to the samples with both zinc oxide and titanium oxide. This formulation was used to coat a surface in the field. FIG. 1 shows the efficiency of the coating. The structure was located in an area with number of trees. Rain water and the dust created a moldy surface over the concrete. The area with green-mold (designated as (A)) is the uncoated surface. The adjacent coated surface, exposed to the same pollutants, remained clean.

Example 8

The composition of Example 7 was applied to the basement floors and walls of a house. The coating provided a hard and dust free surface. For the wall it was applied next to a typical white paint. The quality and aesthetic of the two surfaces were the same. After the floor was coated, the quality of air in the basement improved considerably. There was no muggy smell and spider population dropped to almost 0%. The surface looked like a ceramic surface with the added advantage of self-cleaning under the florescent lighting.

Example 9

The composition of Example 8 was used to coat an active spalling area on a concrete surface in a parking lot. The spalling was caused by salts used to melt snow. The coating stopped the spalling over two winter seasons.

Example 10

The composition used in Example 8 was used to coat clay brick, concrete, sheet rock, steel and wood. The coating was applied with ease using a roller. The cured coating provided an aesthetic, uniform surface.

Example 11

This example illustrates that the coating can be applied to organic substrates. A magnesium phosphate coating composition was prepared by combining 60 grams of mono-potassium phosphate crystals (maximum size 300 microns), 20 grams of magnesium oxide powder (maximum size 100 microns), and 50 grams fine sand (maximum size 500 microns). The components were blended in high shear mixer for 1 minute and allowed to cool for 10 minutes. Water in the amount of 35 grams was added to this mixture. The components were then mixed by hand in a container to obtain a slurry. This slurry was applied to an asphalt surface using a brush and allowed to cure for about an hour. Once the slurry coating dried, the coating of Example 3 was applied.

Adhesion at both interfaces: (a) interface between asphalt and magnesium phosphate layer and (b) interface between magnesium phosphate layer and the coating of Example 3 was strong. The coatings could only be removed with a hammer and chisel. The two layers were compatible and there was no delamination.

Example 12

This example illustrates the graffiti resistance of the coating. The samples coated in Example 1 were sprayed with spray paint and allowed to dry for 3 days. The sprayed organic paint was easily removed by a rotating wire brush that had alumina-tipped wire bristles. The organic paint was also easily removed by using citric-based paint remover and cold water or a hot water high pressure spray.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

What is claimed is:

1. A protective inorganic composition comprising:
    a. a liquid composition portion comprising by weight percent of the liquid composition portion: from about 54% to about 58% by weight water, from about 22% to about 26% by weight of an alkali metal oxide component comprising potassium oxide, wherein up to about 30% by weight of the alkali metal oxide component comprises sodium oxide, and from about 18% to about 22% by weight amorphous silica; and
    b. a powder composition portion comprising by weight percent of the powder composition portion: up to about 65% by weight amorphous silica and calcined clay, a Group II metal oxide powder, high-temperature resistant fillers that are resistant to temperatures up to about 1000° C., microfibers, and discrete fibers;
    wherein the protective inorganic composition is a composition suitable for coating at least a portion of a surface.

2. The composition of claim 1, wherein said amorphous silica has a particle size from about 0.05 to about 2 μm.

3. The composition of claim 1, wherein said clay has an average particle size from about 1 to about 2 μm.

4. The composition of claim 1, wherein said Group II metal is selected from the group consisting of zinc and calcium.

5. The composition of claim 1, wherein said high-temperature resistant filler comprises zirconium silicate.

6. The composition of claim 5, wherein said zirconium silicate has a maximum particle size of 150 μm.

7. The composition of claim 1, wherein said microfibers comprise wollastonite.

8. The composition of claim 1, wherein said discrete fibers have a maximum length of 6 mm and a maximum diameter of 50 μm.

9. The composition of claim 1 further comprising at least one additional component selected from the group consisting of sugars, alcohols, pigments, titanium dioxide, and combinations thereof.

10. The composition of claim 1 further comprising a sugar in an amount from about 0.1% to about 1% by weight of the total composition.

11. The composition of claim 1 further comprising ethyl alcohol in an amount from about 1% to about 3% by weight of the total composition.

12. The composition of claim 1, wherein said clay comprises about 52% by weight silica and about 48% by weight alumina.

13. The composition of claim 1 comprising the liquid composition and the powder composition in a ratio of 1:2 by weight.

14. A method for coating a substrate comprising applying the composition of claim 1 onto the substrate and allowing the composition to cure or dry.

15. The method of claim 14, wherein said applying step comprises spraying, painting, or dip coating the substrate with said composition.

16. The method of claim 14, wherein said substrate comprises concrete, clay, iron, stone, ceramic, timber, steel, or a combination thereof.

17. A coated substrate prepared according to the method of claim 14.

18. An article comprising the coated substrate of claim 17, wherein said article is selected from the group consisting of structural and non-structural components in buildings, exterior walls, interior walls, roofing, bath rooms, tiles, sinks, basements, stairways, structural supports, marine vessel hulls, interior and/or exterior aircraft components, road surfaces, bridges, tunnels, barriers, and water tanks.

19. A method for coating a substrate comprising applying a coating comprising magnesium phosphate onto the substrate, allowing the magnesium phosphate coating to cure or dry resulting in a magnesium phosphate layer, applying the composition of claim 1 onto at least a portion of the magnesium phosphate layer, and allowing the composition of claim 1 to cure or dry.

20. The method of claim 19, wherein said substrate comprises asphalt or a painted surface.

21. A coated substrate prepared according to the method of claim 19.

22. An article comprising the coated substrate of claim 21, wherein said article is selected from the group consisting of structural and non-structural components in buildings, exterior walls, interior walls, roofing, bath rooms, tiles, sinks, basements, stairways, structural supports, marine vessel hulls, interior and/or exterior aircraft components, road surfaces, bridges, tunnels, barriers, and water tanks.

* * * * *